May 14, 1929.  E. A. JOHNSTON ET AL  1,712,797
GRAIN DRILL FEED
Filed June 14, 1926  4 Sheets-Sheet 1
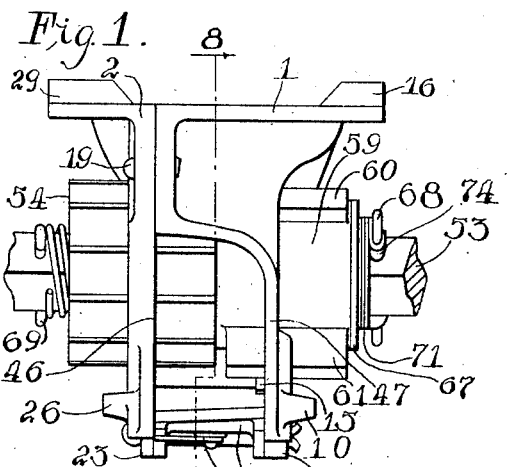
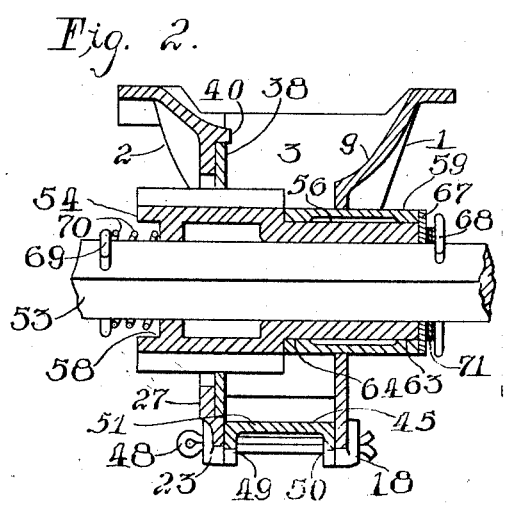
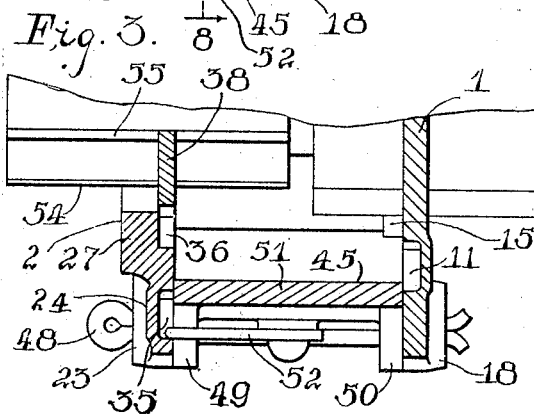
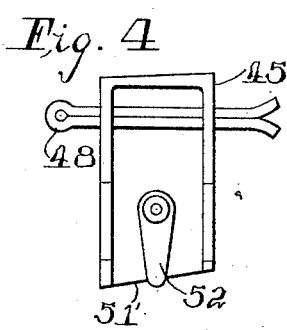
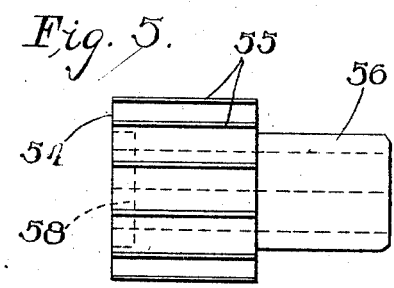
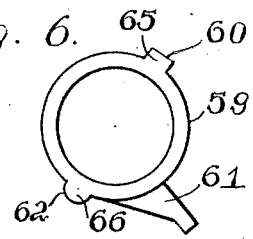
Inventors:
Edward A. Johnston and
Sherman W. Cady.
By H. P. Dareida
Atty.

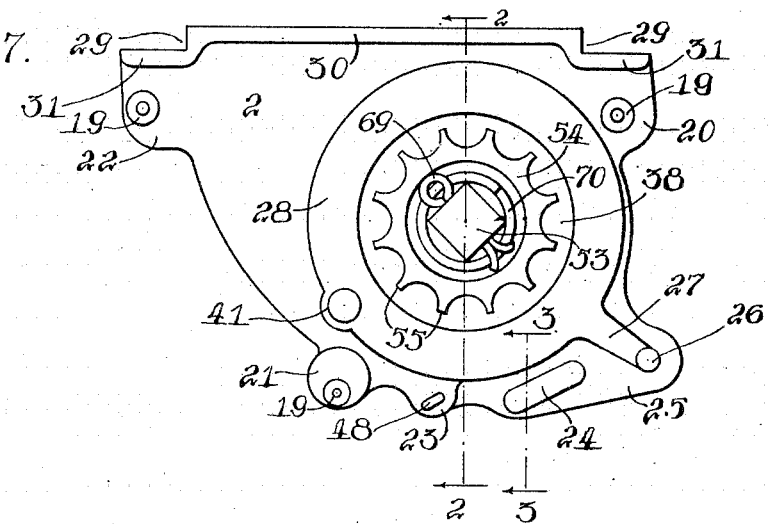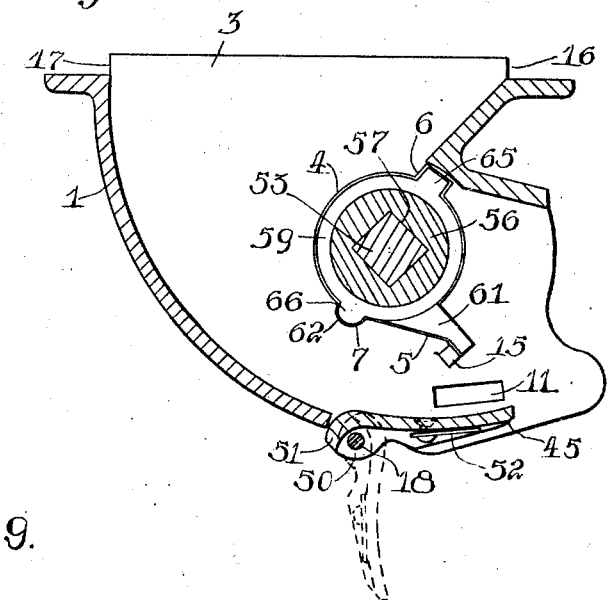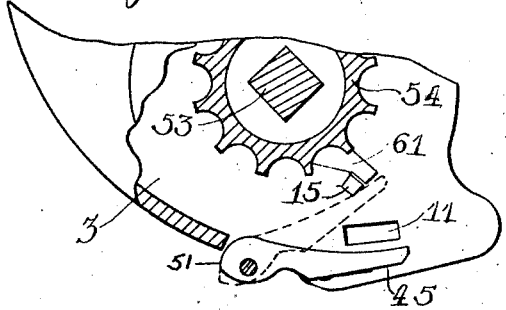

May 14, 1929.   E. A. JOHNSTON ET AL   1,712,797
GRAIN DRILL FEED
Filed June 14, 1926    4 Sheets-Sheet 3

Inventors.
Edward A. Johnston and
Sherman W. Cady.
By W. P. Daniels
Atty.

May 14, 1929.     E. A. JOHNSTON ET AL     1,712,797
GRAIN DRILL FEED
Filed June 14, 1926     4 Sheets-Sheet 4
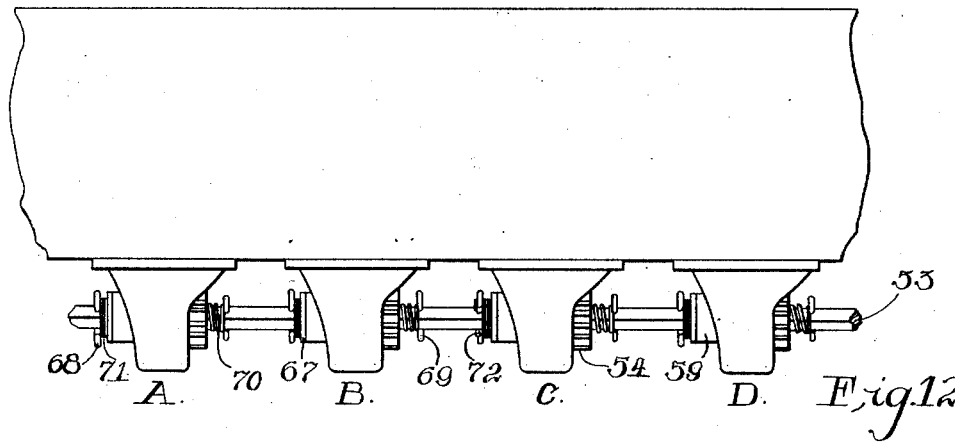
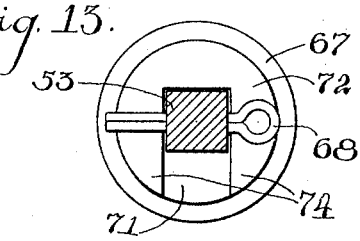
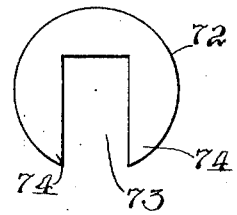
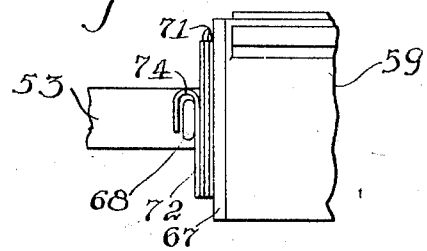
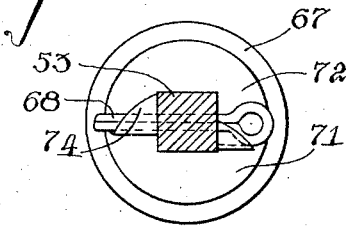
Inventors.
Edward A. Johnston and
Sherman W. Cady.
By H. P. Sadwith
Atty.

Patented May 14, 1929.

1,712,797

UNITED STATES PATENT OFFICE.

EDWARD A. JOHNSTON AND SHERMAN W. CADY, OF CHICAGO, ILLINOIS, ASSIGNORS TO INTERNATIONAL HARVESTER COMPANY, OF CHICAGO, ILLINOIS, A CORPORATION OF NEW JERSEY.

GRAIN-DRILL FEED.

Application filed June 14, 1926. Serial No. 115,710.

This invention relates to hopper discharging mechanisms which are employed to effect a regulated discharge of grain from the hopper of a grain drill to the boot of the drill. Devices of the type to which this invention pertains are variously named feed cups, force feeds, hopper discharging mechanisms, and seed feeding mechanisms. This invention relates to such a mechanism which employs a fluted feed wheel rotatable within a casing to discharge seed therefrom, and shiftable endwise through the casing to vary the rate of discharge of the seed.

Another object of the invention is to provide an improved hopper discharging mechanism capable of long sustained and efficient service by reason of its novel construction.

A further object of the invention is to provide a hopper discharging mechanism in which excessive wear will not cause the parts to get out of alignment to such an extent that their operation will become irregular and unsatisfactory.

Another object of the invention is to provide a feed regulator of novel construction for properly governing the rate of flow of seeds from the hopper discharging mechanism and for desirable adjustment to any one of a plurality of positions for adapting the feeding device for handling seeds of different sizes.

Such hopper discharging mechanisms are usually employed in a structure which includes a series of them equally spaced along a driving shaft and beneath a single hopper. It is important, in this case, that all of the feeding or discharging mechanisms can be regulated alike, so that they will all cease operation when the driving shaft is shifted to a certain position and so that they will all have the same effective seed discharging result in whatever position of adjustment the seed shaft is placed. A further object of the invention is to provide a grain drill feeding device which may be advantageously and accurately adjusted after assembly to accomplish the above result.

Another object of the invention is to provide a hopper discharging mechanism in which the parts will remain in accurately aligned condition throughout the normal life of the grain drill.

An illustrative embodiment of the invention is shown in the accompanying drawings, in which:

Figure 1 is an elevation of a hopper discharging mechanism constructed in accordance with the teachings of this invention;

Figure 2 is a vertical sectional view of the hopper discharging mechanism taken on the section line 2—2 of Figure 7;

Figure 3 is a detail view illustrating in vertical section the relation of the feed regulator to the walls of the casing, taken on the section line 3—3 of Figure 7;

Figure 4 is an elevation of the feed regulator showing the means for locking it in various positions;

Figure 5 is an elevation of the integral construction of the fluted feed wheel and extended trunnion bearing for the follower;

Figure 6 is an end elevation of the follower showing the lugs which provide a three-point support for the follower;

Figure 7 is an end elevation of the entire hopper discharging mechanism, showing the relation of the casing to the feed wheel;

Figure 8 is a longitudinal vertical section through the entire hopper discharging mechanism illustrating the relation of the follower and the feed regulator to the cooperating parts of the casing, and taken on the line 8—8 of Figure 1;

Figure 9 is a detail view indicating the various positions to which the feed regulator may be adjusted;

Figure 12 is a view somewhat in the nature of a diagrammatic view showing a portion of a grain drill hopper with a series of the illustrative hopper discharging mechanisms applied thereto;

Figure 13 is an elevation of the end of one of the feed wheel assemblies indicating the manner in which the insertable shims are applied;

Figure 14 is a plan of the U-shaped shim used in connection with the hopper discharging mechanisms shown;

Figure 15 is a plan view showing an end of a feed wheel assembly and indicating the manner in which the insertable shims are located in position on the feed shaft; and Figure 16 is a detail view showing in elevation the relationship of parts when an insertable shim is used for correcting irregularities of the hopper discharging mechanisms herein shown.

Figure 10:
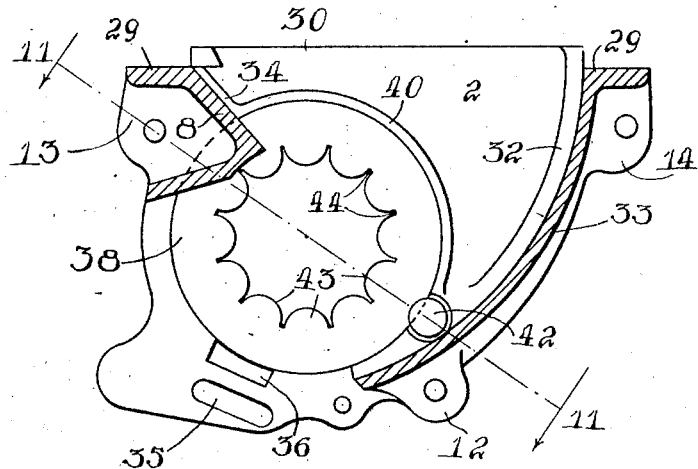
Figure 10 is a longitudinal vertical section through the casing illustrating the manner in which the closure plate is rotatably confined.

The illustrative hopper discharging mechanism includes a casing which is adapted to be secured to the bottom of a hopper for holding a supply of seeds. Within the casing a feed wheel is mounted for rotatively discharging seeds from the casing. Inasmuch as the casing shown is made up of a plurality of parts which may be assembled, manufactured, and shipped as a unit separate from the remainder of the mechanism, and, inasmuch as the feed wheel is intimately associated with a plurality of elements which form a substantially unitary structure mounted upon a feed shaft, the casing parts will be herein described as a casing assembly, and the feed wheel and its intimately associated parts will be described as a feed wheel assembly. These two subject-matters will be separately treated below.

The casing assembly.

Preferably the illustrative casing comprises two sections, a primary section 1 and a complementary section 2. These sections are joined so as to form a feed chamber 3. The primary casing section is provided with a central opening 4. This opening is substantially circular and is extended at three circumferentially spaced points to provide guiding notches or slots 5, 6 and 7, the function of which will hereinafter appear. An integral projection 8 is formed on the primary casing section 1. This projection affords a sloping wall of a feed chamber for suitably guiding the contents of the chamber.

The primary casing section 1 is also provided with a curved deflecting wall 9, a boot supporting lug 10, a notch 11 for a purpose hereinafter referred to, and lateral extensions 12, 13 and 14 bored to receive securing means. It is also provided with an integral stop 15 and shoulders 16 and 17 for promoting the effective interlocking of the casing with the hopper with which it is associated in practice. A pivot boss 18 is also formed as a unitary extension on the primary casing section.

The relation of the complementary casing section 2 to the primary casing section 1 is well illustrated in Figures 1 and 2 of the annexed drawings. Preferably, the complementary casing section is a casting secured to the primary casing section by means herein shown as rivets 19. The complementary casing section corresponds in general outline to the outline of the primary section and is formed with attachment projections or lugs 20, 21 and 22 corresponding to and contacting with similar lugs upon the primary section. As shown in Figure 7, the complementary section is also provided with a pivot boss 23, disposed directly opposite the pivot boss 18. Forwardly of the pivot boss 23 is a reinforcement boss 24 formed in a projection 25 which is extended from the complementary section to adequately maintain a boot supporting lug 26. Breakage of the projection is prevented by the reinforcement rib 27 herein shown as an integral part of the section 2, and forming substantially a radial projection of the circular rib 28. The upper part of the section 2 is formed with shoulders 29 corresponding to similar shoulders 16 and 17 formed upon the primary section. Between the shoulders 29 is an upward projection 30 adapted to extend into the grain drill hopper. In practice, suitable securing elements pass through the flanges 31 and into the bottom of the grain drill hopper.

In order that the two sections of the casing may be maintained in correct relative positions, and to provide proper interfitting of the sections, the section 2 is formed with the curved rib 32 closely contacting with the curved wall 33 of the primary section. Opposite the rib 32 there is shown another flange or rib 34 contacting with the sloping wall of the projection 8 of the primary section. These ribs are plainly shown in Figure 10. In this figure the complementary casing section 2 is viewed from the interior of the hopper discharging mechanism. As here viewed, spaced adjusting recesses 35 and 36 are shown, the former being opposite the reinforcement boss 24, shown in Figure 7.

Figure 11:
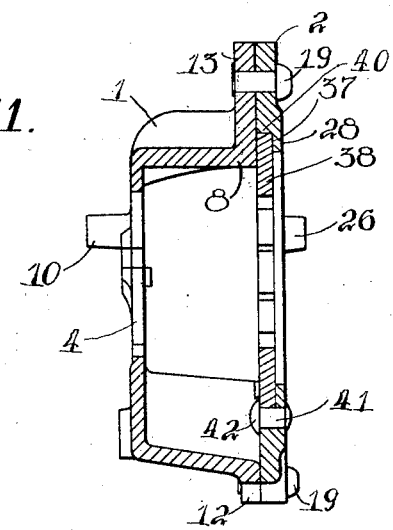
Figure 11 is a sectional view taken upon the section line 11—11 of Figure 10.

As indicated in Figures 7 and 11, the circular rib 28 provides a flange on section 2 extending radially inward of that section. Section 2 also is provided with a circular recess 37 in which a scalloped closure plate 38 is rotatable. This closure plate is held in position between the two casing sections, as indicated in Figure 11, and is protected by an arcuate rib 40 herein shown as formed integrally on the casing section 2. This rib 40 prevents the material handled from having access to the bearing surfaces on plate 38 and the casing section 2.

The closure plate 38 is mounted within the recess 37 prior to the joining of the casing sections 1 and 2. For the purpose of holding the plate 38 within the recess 37, a retainer, herein shown as a rivet 41, is mounted on the casing section 2. The head 42 of this rivet has a surface parallel to a portion of the inner flange 28, this flange and the rivet head thereby forming parallel retaining surfaces for the closure plate 38. When the casing sections are joined as indicated in Figure 11 the projection 8 of the primary section engages the plate 38 at points substantially diametrically opposite from the points at which the retainer 41 engages the plate. There are thus provided diametrically opposite projections or retainers for rotatively confining the plate 38 within the recess 37.

The closure plate 38 is preferably in the form of an annulus or washer, such elements being sometimes termed rosette washers. It is made of material of sufficient hardness to adequately resist wear and its inner surface is characterized by substantially semi-circular projections 43 separated by substantially flat surfaces 44, the inner contour of the plate being such that it will closely receive the fluted feed wheel to be later described.

In order that hopper discharging mechanisms of the kind here disclosed may be adapted for the successful handling of grains and seeds of various sizes, it is desirable that means be provided for varying the size of the discharge throat. A certain size of discharge throat may be suitable for delivering a small stream of small seeds, but would involve the crushing and breaking of seeds of much larger size. For instance, a hopper discharging mechanism provided with a small throat for successfully planting a relatively small quantity of wheat per acre would not be adapted for the handling of such seeds as beets, peas and beans.

It is also a desideratum of hopper discharging mechanisms of the character here disclosed that means be provided which will allow the "dumping," or complete elimination of dust, dirt and seeds which may remain pocketed in the casing after the user has finished with the normal planting operation. In the illustrative mechanism means for accomplishing the above mentioned results is provided in the form of a feed regulator 45 preferably mounted between the parallel walls 46 and 47 of the casing assembly. As indicated in Figures 2 and 3 of the drawings, this feed regulator is mounted upon a pivot member herein shown as a cotter pin 48 extending through the opposed pivot bosses 18 and 23. In Figure 3 there are also indicated the flanges 49 and 50 formed on the feed regulator and bored to receive the cotter pin. For the purpose of permitting the feed regulator to remain in close contact with the arcuate wall 33 of the casing assembly, the feed regulator is provided with a hood 51, as particularly shown in Figure 8 of the drawings. The hood is curved so as to maintain the proper relationship of the feed regulator to the casing wall in all positions of adjustment. The forward end of the feed regulator has a slanting edge, as shown at 51′, for preventing bunching of seeds.

For planting small seeds, the feed regulator is moved to the position indicated in dotted lines in Figure 9, wherein it engages the stop 15 heretofore described. For planting large seeds the feed regulator is moved to the position shown in full lines in Figures 8 and 9. It may also be moved to an intermediate position for planting seeds of medium size. For effectively maintaining the feed regulator in any one of the above described positions of adjustment, a simplified locking device, herein shown as a pivoted latch 52, is provided. This latch is preferably pivoted upon the regulator for movement toward either of the parallel walls 46 and 47 of the casing. In Figure 3 of the drawings, the latch 52 is shown as having its end entering the lowest notch 35 in the casing wall 46. This is the position of adjustment adapting the hopper discharging mechanism for the planting of seeds of larger size. When it is desired to plant seeds of intermediate size, the latch 52 is swung toward the wall 47 and the feed regulator is moved upwardly upon its pivot so that the latch may enter the notch 11. The smallest seeds are handled when the latch 52 is positioned within the notch 36 on the wall 46. When it is desired to allow all accumulations of material to be eliminated from the casing, the latch 52 may be moved to an intermediate position and the feed regulator moved downwardly about its pivot 48 until it is in substantially vertical position, as shown in dotted lines in Figure 8. All undesirable accumulations may then drop from the casing, which will, therefore, not be unduly deteriorated by rust and corrosion promoted by such accumulations.

The feed wheel assembly.

The parts herein described under this heading include elements which act as a unitary organization upon a driving shaft. They are all compactly assembled upon the shaft and are movable therewith. Each assembly includes a rotatable element for acting upon the material within the above described casing, and a follower, or cut-off block, slidably movable with the shaft to regulate the flow of material from the casing.

Each feed wheel assembly is mounted upon a driving and controlling element herein shown as a driving shaft 53, which is preferably of square cross section. The element for acting upon the material in the casing to discharge it therefrom is shown as the feed wheel 54 non-rotatively mounted with relation to the driving shaft 53. This feed wheel has projections upon its circumference forming corrugations or flutes 55 for promoting adequate contact with the material within the casing.

Undue wear with its consequent misalignment of parts and irregular discharging of grain and seeds is minimized in the present form of hopper discharging mechanism by providing the feed wheel 54 with a relatively long bearing trunnion 56 herein shown as formed integrally with the fluted portion of the feed wheel. This bearing trunnion is of reduced diameter as compared with the fluted portion and is of a length substantially equal to the length of the fluted portion. The external surface of the bearing trunnion is preferably "chilled" so as to form a hardened bearing surface, and the trunnion is formed internally with a square bore 57 closely receiving the shaft 53 and forming an elongated contact surface. Opposite from the bearing trunnion, and formed within the fluted portions of the feed wheel is a circular recess, or spring housing, 58, which plays an important part in the production of a compact feed wheel assembly. This compactness will be appreciated as of considerable importance, in view of the fact that it is desirable to closely arrange a large number of such assemblies upon a single feed shaft. In many of the larger grain drills as many as 28 of the illustrative feed wheel assemblies are arranged on six inch centers beneath a single hopper, 14 of these assemblies being arranged upon a single feed shaft. The feed wheel just described is particularly well shown in Figures 2 and 5 of the accompanying drawings.

In practice, the fluted portion of the feed wheel is so arranged that it can be moved within the feed chamber or casing to regulate the discharge of seeds or other material from the grain drill hopper. In the present instance, the feed shaft is slidable in the direction of its length to project the feed wheel at different distances within the feed chamber. As the feed wheel moves outwardly of the feed chamber a discharge of increasing size would allow the seeds to drop indiscriminately from the hopper unless means were provided for shutting off that discharge. The illustrative follower, or cut-off block, 59 moves with the feed wheel to accomplish this purpose. As the feed wheel assembly (see Figure 2) is moved toward the right to decrease the discharge of material from the hopper, the cut-off block 59 moves with it, preventing the flow of material from the hopper by gravity. The illustrative cut-off block has radial projections 60 and 61 constituting upper and lower cut-offs for accomplishing this purpose.

The cut-offs, or radial projections, 60 and 61 act in conjunction with a third radial projection, or guide, 62 to properly maintain the cut-off block in correctly centered position relative to the feed chamber and casing section 1. The edge of the opening 4 in this casing section corresponds to the surface of the follower and its extensions or notches 5, 6 and 7 prevent the cut-off block from rotation with respect to the feed chamber, but allow free sliding movement of the cut-off block within the casing section.

The cut-off block is mounted upon the bearing trunnion 56, as clearly shown in Figure 2 of the drawings, and, by reason of the relatively great length of the bearing trunnion, misalignment of the parts with its consequent ill effect upon the feed of material from the hopper is reduced to a minimum. The cut-off block is of substantially the same length as the bearing trunnion 56 and is formed integrally with inwardly projecting portions constituting the relatively widely spaced bearings 63 and 64. The structure of the cut-off block, or follower, 59 is well indicated in Figures 1, 2, 6 and 8 of the drawings.

It has been proposed to construct hopper discharging mechanisms for grain drills having an upper cut-off somewhat similar to the upper cut-off 60, above described. Cut-off blocks have also been made having a gate similar to the lower cut-off 61 of the present disclosure, but structures made in accordance with such proposals have been found to be defective. In such structures the end of the upper cut-off strikes the closure plate 38 and is forcibly pressed against that plate when the feed shaft and its feed wheels are moved to the right hand limit of their paths of sliding movement. Such pressure has had a tendency to tip the cut-off block out of its correct operative position and such tipping has been particularly objectionable in hopper discharging mechanisms which have been used for any great length of time. Such mechanisms have been provided with only a short single bearing surface between the elements corresponding to the feed wheel 54 and the cut-off block 59, and, by reason of this arrangement, a feed wheel assembly has been subject to center sagging and excessive tipping of the nature above indicated. In the present instance, such tipping of the parts when the feed wheel assemblies are moved to inoperative position is prevented by providing a plurality of stops on the cut-off block 59, said stops contacting with the closure plate when the feed wheel assembly is moved to the extreme right hand limit of its sliding movement, (as shown in Figure 2). The illustrative cut-off block is provided with two diametrically opposed stops located in the same plane perpendicular to the axis of the drive shaft 53. These stops 65 and 66 are formed, respectively, by the end of the upper cut-off 60 and the end of the guide 62, as indicated in Figure 6 of the drawings. It is within the inventive scope of the present invention that a greater number of such stops may be provided, the essential idea being that the lateral pressure forcing the cut-off against the closure plate is so balanced that there is no tendency to tip or tilt the cut-off block from its correctly aligned position. This feature of construction promotes regularity of the drill operation and enhances the durability and long life of the hopper discharging mechanism.

In Figure 2, there is shown a thrust plate 67. This plate is preferably constructed in the form of a heavy gage washer having a square bore conforming to the contour of the shaft 53. This thrust plate is in close contact with the end of the bearing trunnion 56, and in conjunction with parts to be later described acts to rotatively confine the cut-off block or follower upon the bearing trunnion. It is to be appreciated that the feed wheel 54 with its bearing trunnion is constantly rotated while the grain drill is in operation and that the cut-off block 59 is held against rotation, thereby acting as a bearing for the feed wheel. Preferably there is sufficient clearance between the end of the cut-off block and the thrust plate 67 for preventing excessive friction and undue wear. As such mechanisms are constructed in actual practice, there is substantially no wear upon the end faces of the cut-off block.

The feed shaft is provided with a plurality of pairs of stops, such a pair of stops being indicated at 68 and 69 in the drawings. These stops are preferably detachably mounted upon the feed shaft and are herein shown as cotter pins extending through the shaft. The stops of each pair are spaced a distance substantially greater than the over-all length of the feed wheel and bearing trunnion construction, so as to permit said construction to have sliding movement upon the shaft.

As shown in Figure 2 of the drawings, the feed wheel is pressed toward the stop 68 by means of a coil spring 70, which is preferably located within the recess 58. That spring bears against the stop 69 and is of such strength that the feed wheel may be conveniently manually moved against the pressure of the spring. From consideration of the above construction, as shown in Figure 2, it will be appreciated that end thrust upon the end faces of the cut-off block 59 may be substantially eliminated by providing the clearance above mentioned. In this construction, the end thrust caused by the spring 70 is taken up by the unitary feed wheel and bearing trunnion construction and transferred entirely through that construction instead of through the cut-off block, as in the above mentioned proposed structures.

In grain drills wherein a large number of hopper discharging mechanisms are closely assembled on a common driving shaft it is important that all of the feed wheels be uniformly set relative to the casings and more particularly relative to the closure plates. The importance of such uniform setting will be appreciated when it is realized that variations of the projections of the feed wheels within the casing of an extent as small as one sixteenth of an inch will result in the unnecessary use of many bushels of grain in the planting of a single field. If some of the feed wheels project into their casings more than others, the result will be irregular planting; seed will be wasted by the planting of too many seeds in a single row; an uneven stand of grain will be produced; and some rows will not be drilled for considerable portions of their lengths. Furthermore, if some of the feed wheels project into their casings more than others, they will shut off prematurely and prevent the remaining discharging mechanisms from being completely shut off, which would also mean that some of the feed wheels would sow grain more lightly than others.

Various attempts have been made to remedy the above described defects. Moving of the casings after complete assembly has been tried. This involves the removal of the screws securing the casings to the hopper and the attempt to place those screws in new holes offset as little as one thirty-second of an inch from the axes of the original holes. It was found practically impossible to secure the casings in their new positions in this manner by reason of the fact that the screws would seek their former positions. The result was that the support of the casing was rendered insecure and that the condition sought to be remedied was only aggravated. The entire grain drill was also rendered more inefficient. It has also been proposed to provide a plurality of holes in the feed shafts so that the stops, (such as the present stops 68 and 69), could be adjusted; but this proposal has not been productive of the desired results due to the relative great distances between those holes as compared to the extent of the necessary adjustment of the feed wheels. It has been further proposed to properly and uniformly set the feed wheels by providing a collar upon the feed shaft, the collar being held by a set-screw.

Due to the above set forth conditions, complaints have been continually registered by the users of grain drills, and these machines have caused manufacturers considerable concern and annoyance, as there seemed to be no way out of the difficulty until the discovery of the present invention. The manner in which this invention solves these problems will be now set forth.

Referring to the drawings, a plurality of adjusting washers 71 are shown mounted on the feed shaft 53 between each stop 68 and its adjacent thrust plate 67. Figure 12 of the drawings shows three of such adjusting washers applied to each hopper discharging mechanism units A, B, C and D. It will be understood that in Figure 12 only a portion of a grain drill hopper is shown and that, in practice, a much greater number of the hopper discharging mechanisms may be attached to the same hopper. It will also be understood that a smaller or greater number of the adjusting washers may be applied to each feed wheel assembly. These washers are preferably made of thin gage sheet metal so that they may be easily removed by tearing. In practice, when the grain drill parts are assembled as indicated in Figure 12, an inspection is made to determine the variations in the settings of the feed wheels. If it is found, for instance, that some feed wheels, (A and C for instance, in Figure 12), come to fully closed or shut-off position before the other feed wheels, the inspector bends the edge of a washer of each of the prematurely closing feed wheels, grasps the washers with pliers and tears them from the shaft. The spring 70 thereupon forces those feed wheels closer to the stops 68 to an extent depending upon the thickness of the washer removed. If still further adjustment of the feed wheel setting is required, other washers may be removed in the same manner.

If the inspector finds that a few of the feed wheels come to full feeding position prematurely, it is necessary to add to, rather than substract from, the total amount of spacing for those prematurely opening feed wheels. Means are provided for accomplishing this result without removing any parts or disassembling any portion of the mechanism shown. U-shaped shims 72 serve the purpose of additional spacing means to accomplish the above indicated results. These shims are preferably constructed of thin sheet metal and are formed with a slot, or notch, 73 adapted to closely receive the shaft 53, the prongs 74 forming pointed guides for assisting in the installation of the shims.

The springs 70 allow the feed wheels to be shifted manually away from the stops 68 so that the shims may be slipped over the shaft 53 into position between the washers 71 and the stops 68, as indicated in Figures 12, 13, and 15 of the drawings. After a shim 72 is positioned as shown in Figure 13, the prongs 74 are bent or hooked around the stop 68, as plainly shown in Figures 15 and 16 of the drawings, thus securely positioning the shim on the shaft. If an adjustment of an extent greater than the thickness of one shim is required on any feed wheel, a plurality of shims may be applied and locked in position in the same manner.

By reason of the spring resisted sliding movement which the feed wheels may have, it is possible for all of the feed wheels of a grain drill to be accurately set in the field as well as in the factory, and temporary adjustments are also feasible in case an adequate supply of the shims 72 is not on hand. The user may, for instance, simply manually push a feed wheel against the force of the spring 70 and insert a stick, a nail or a piece of wire between the stop 68 and the washer 71, the action of the spring, (when the feed wheel is released), holding any such improvised spacing means in place.

By way of illustration of the above described manner of accurately setting the feed wheels, Figure 12 of the drawings shows the unit C as provided with four of the shims 72, while the other units A, B and D are each provided with three of the adjusting washers 71.

The present invention is not limited to the specific details of construction, arrangement and mode of operation shown in the drawings, since the same may be variously modified to suit different conditions or requirements met in actual practice. Moreover, it is not indispensable that all features of the invention be used conjointly, since they may be advantageously used in various different combinations and sub-combinations.

Having described our invention, we claim:

1. In a hopper discharging mechanism for grain drills, a casing having parallel walls, a rotary feed member mounted in said casing, a feed regulator interposed between the walls of the casing and movable relative to the walls and to the feed member, and means mounted on the feed regulator and cooperating with the walls of the casing to hold said regulator in any one of a number of different positions of adjustment.

2. In a hopper discharging mechanism for grain drills, a casing having parallel walls, a rotary fluted feed wheel mounted within said casing, said walls being provided with a plurality of opposed recesses, the recesses in the opposite walls being at different vertical positions, a pivoted feed regulator cooperating with said feed wheel and mounted between said walls, and means mounted upon the feed regulator and engageable with a recess in either wall to hold the feed regulator in any desired position of vertical adjustment.

3. In a hopper discharging mechanism for grain drills, a casing, and a feed wheel assembly rotatable within said casing, said wheel shaft assembly comprising a feed shaft, a combined feed wheel and bearing trunnion non-rotatably mounted on said feed shaft, a follower rotatively receiving said bearing trunnion, a thrust plate mounted on said feed shaft and engaging the follower and the bearing trunnion, a spring surrounding the shaft and seated within the end of the feed wheel opposite the bearing trunnion, and means normally fixed with relation to the shaft for holding the parts of the feed shaft assembly in operative condition.

4. In a hopper discharging mechanism for grain drills, a rotary feed member, and a casing assembly substantially enclosing said feed member, said casing assembly comprising a primary casing section, a complementary casing section, said sections being interfitted so that they may be joined to form a feed chamber, a scalloped closure plate, one of said sections being formed with a circular recess in which said closure plate is rotatable, said closure plate being confined within said recess by contact with said sections, and a feed regulator movably mounted upon said sections and cooperating with said feed member, said feed regulator being provided with means movable from one section to the other to hold the feed regulator in different positions of adjustment.

5. In a hopper discharging mechanism for grain drills, a primary casing section, a complementary casing section secured to the primary section, a fluted feed wheel operating within the feed chamber formed by said sections, a shaft for supporting said feed wheel, said feed wheel having a reduced portion forming a bearing trunnion, a follower corresponding in length to the length of said trunnion and rotatively related thereto, said follower and feed wheel being slidable as a unit with relation to the casing sections to vary the discharge of said feed mechanism, a closure plate rotatively mounted within a recess in the complementary casing section and formed so as to closely fit the fluted feed wheel, said closure plate being interposed between said casing sections and allowing sliding movement of the feed wheel with relation thereto, a feed regulator interposed between said sections and pivotally mounted thereon, and means carried by the feed regulator for retaining it in any one of a number of different vertical positions between the casing sections.

6. In a hopper discharging mechanism for grain drills, a driving shaft, a fluted feed wheel rotatable with said shaft, said feed wheel being formed with an integral trunnion affording spaced bearing surfaces, a follower rotatively receiving said trunnion, a thrust plate mounted upon said shaft and engaging the end of said trunnion, an adjusting washer mounted on said shaft, the end of said feed wheel opposite said trunnion being formed with a recess, a compression spring surrounding said shaft and entering said recess to engage the feed wheel, stops detachably secured to said shaft for confining all of the above mentioned elements within a certain portion of the length of said shaft, a casing surrounding the feed wheel and the follower, said casing being formed of a plurality of sections, one of said sections slidably and non-rotatively receiving said follower, the other of said sections being formed with a circular recess, a closure plate rotatively mounted within said recess and confined therein by contact with said sections, and a pivoted feed regulator mounted between said sections and movable therebetween to any one of a number of positions of adjustment.

7. A hopper discharging mechanism having a casing formed with parallel walls, a fluted feed wheel, a pivoted feed regulator mounted between said walls and movable therebetween to regulate the discharge of material from said mechanism, and locking means mounted on said regulator between said walls.

8. A hopper discharging mechanism for grain drills having a fluted feed wheel and a follower, said feed wheel being formed with an integral barrel extending the full length of the follower.

9. A fluted feed wheel having an integral extension forming a bearing trunnion of a length substantially equal to the length of the feed wheel.

10. In a hopper discharging mechanism for grain drills, a fluted feed wheel construction formed with a fluted portion and a projecting trunnion portion, and a follower forming a bearing enclosing the feed wheel trunnion portion, said fluted portion having a recess in one end, said trunnion portion being opposite the recess and of a diameter less than the fluted portion.

11. In a hopper discharging mechanism for grain drills, a casing providing a feed chamber, a feed wheel rotatably mounted within said casing, a follower, said feed wheel being integrally formed with a bearing trunnion extending substantially through said follower, said follower being non-rotatively but slidably related to said casing by means of three radial lugs.

12. In a hopper discharging mechanism for grain drills, a casing, a rotary feed wheel within said casing, a follower, a feed regulator pivotally mounted within said casing so as to act in conjunction with the walls of the casing and the feed wheel to form a discharge throat, and means carried by the feed regulator for cooperating with the casing to hold the feed regulator in any one of a number of different vertical positions.

13. In a hopper discharging mechanism for grain drills, a casing, a rotary feed member mounted in said casing, a feed regulator movable within said casing, locking means mounted on the feed regulator for holding the feed regulator in any desired position of adjustment, and means formed in the opposite walls of said casing for cooperating with said locking means, said locking means being swingable from one wall to the other.

14. In a hopper discharging mechanism for grain drills, a casing, a fluted feed wheel rotatively mounted within said casing, and a follower, said feed wheel being constructed substantially as a cylindrical block a substantial portion of the length of which is reduced in diameter so as to form the entire rotatable bearing support for the feed wheel.

15. In a hopper discharging mechanism for grain drills, a casing, and a feed shaft assembly rotatable within said casing, said feed shaft assembly comprising a feed shaft, a unitary feed wheel and bearing trunnion mounted on said shaft, a follower rotatably receiving said bearing trunnion, and a thrust plate engaging said bearing trunnion.

16. In a hopper discharging mechanism for grain drills, a casing, and a feed wheel assembly rotatable within said casing, said feed wheel assembly comprising a feed shaft, a unitary feed wheel and bearing trunnion mounted on said shaft, and a thrust plate engaging the end of said bearing trunnion.

17. In a hopper discharging mechanism for grain drills, a casing, and a feed wheel assembly rotatable within said casing, said feed wheel assembly comprising a feed shaft, a unitary feed wheel and bearing trunnion mounted on said shaft, a follower located at one side of said feed wheel and rotatively receiving said bearing trunnion, a spring engaging a side of said feed wheel opposite from the follower, and a thrust plate engaging the end of said trunnion.

18. In a hopper discharging mechanism for grain drills, a casing, and a feed wheel assembly rotatable within said casing, said feed wheel assembly comprising a feed shaft, a combined feed wheel and bearing trunnion nonrotatively mounted upon said feed shaft, a follower rotatably receiving said bearing trunnion, a thrust plate mounted upon said feed shaft and engaging the bearing trunnion, stops upon said feed shaft to limit the movement of said combined feed wheel and bearing trunnion, and easily destructible thin metal adjusting washers mounted upon said feed shaft between one of said stops and said thrust plate.

19. In a hopper discharging mechanism for grain drills; a casing; and a feed wheel assembly rotatable within said casing; a stop secured to the shaft at each end of the feed wheel assembly; said feed wheel assembly comprising a feed shaft, a combined feed wheel and bearing trunnion, a follower rotatably receiving said bearing trunnion, a thrust plate mounted upon said shaft and engaging the bearing trunnion, and manually rupturable shims mounted upon said shaft between one of said stops and the thrust plate.

20. In a grain drill, a hopper, a plurality of hopper discharging mechanisms attached to said hopper, a feed wheel for each hopper discharging mechanism, a driving shaft passing through said hopper discharging mechanisms, pairs of stops for properly locating the feed wheels on the shaft, a spring on said shaft for yieldingly urging each feed wheel toward one of each of said pairs of stops, and shims insertable between each feed wheel and its stop after the hopper discharging mechanisms are assembled on said shaft.

21. In a grain drill, a hopper, a plurality of hopper discharging mechanisms attached to the bottom of said hopper, a feed wheel for each of said hopper discharging mechanisms, a driving shaft passing through said hopper discharging mechanisms and feed wheels, a pair of stops detachably mounted upon the shaft for properly locating the feed wheel of each hopper discharging mechanism, a spring mounted on the shaft between each feed wheel and one stop of each pair of stops, and driving shaft straddling shims insertable between each feed wheel and the other stop of each pair of stops, said shims being inserted in the position indicated after the hopper discharging mechanisms are assembled on said shaft.

22. In a grain drill, a hopper, a plurality of hopper discharging mechanisms, a feed wheel for each hopper discharging mechanism, a feed wheel driving shaft, a pair of stops for each feed wheel, a spring between each feed wheel and one stop of each pair of stops, and U-shaped driving shaft straddling shims insertable between the feed wheel and the other stop of each pair of stops.

23. In a grain drill, a hopper, a plurality of hopper discharging mechanisms attached to the bottom of said hopper, a feed wheel in each hopper discharging mechanism, a driving shaft extending through said hopper discharging mechanisms, stops detachably mounted on said feed shaft, springs on said shaft engaging the feed wheels, easily destructible thin metal washers mounted on said shaft adjacent each feed wheel, and U-shaped shims insertable between each feed wheel and an adjacent stop after the hopper discharging mechanisms are assembled on the shaft, each shim being interlocked with the adjacent stop.

24. In a grain drill, a hopper, a plurality of hopper discharging mechanisms attached to the bottom of said hopper, a feed wheel in each hopper discharging mechanism, a common driving shaft for said hopper discharging mechanisms, a pair of stops for each hopper discharging mechanism, a spring for each hopper discharging mechanism, easily destructible thin metal washers mounted upon the shaft between each pair of stops, and U-shaped shims straddling the shaft and adapted to be inserted between each feed wheel and one of said stops after the hopper discharging mechanisms are assembled on said shaft, said U-shaped shims being bent into interlocking engagement with adjacent stops.

25. A hopper discharging mechanism for grain drills comprising, in combination, a casing, a feed shaft, a follower slidably and non-rotatively related to the casing and having a substantially cylindrical bore having restricted portions near its ends forming bearings, and a feed wheel having a fluted portion and a reduced cylindrical extension positioned within the bore of the follower and rotatably mounted by said bearings.

26. A grain drill comprising, in combination, a wheel supported frame, a hopper supported upon the frame and extending transversely of the frame, a plurality of hopper discharging mechanisms secured to the bottom of the hopper, a rotary feed wheel mounted in each discharging mechanism, a common operating shaft extending through the hopper discharging mechanisms and the feed wheels, a pair of stops for each discharging mechanism secured to the shaft, means interposed between each pair of stops for urging the feed wheel toward one of said stops, and a plurality of manually rupturable shims strung on the shaft and located between each feed wheel and one of said stops, said shims being removable from the shaft by tearing to secure uniformity of discharge of all of said discharging mechanisms without disassembling any of said discharging mechanisms.

In testimony whereof we affix our signatures.

EDWARD A. JOHNSTON.
SHERMAN W. CADY.